(No Model.)
R. T. REASONS.
TRANSPLANTER.
No. 601,984. Patented Apr. 5, 1898.
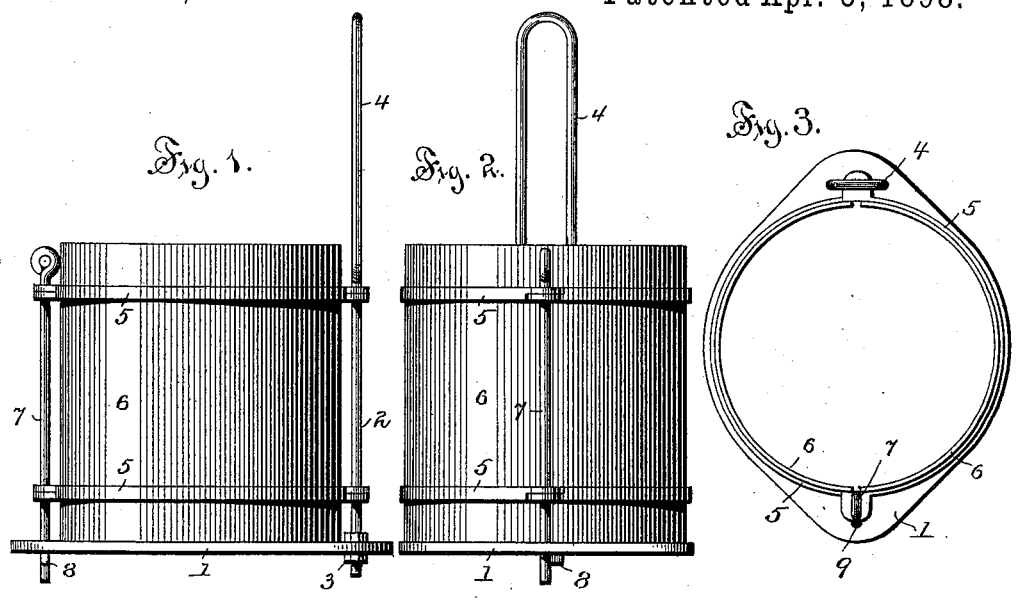
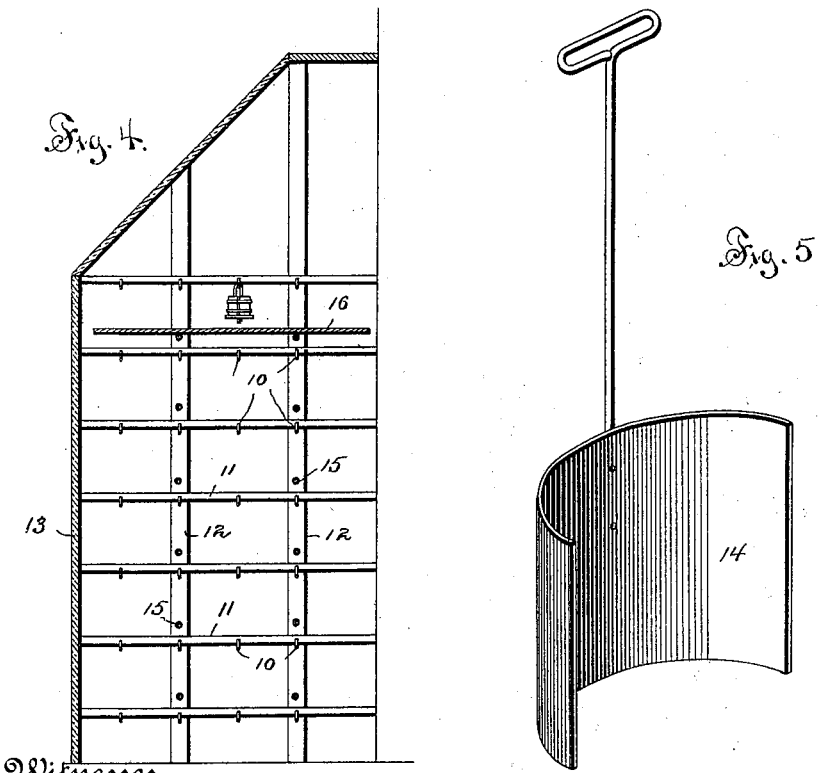
Witnesses
John Enders, jr.
Royal E. Burnham.
Inventor
Ross T. Reasons,
By L. Deane & Son
his Attorneys

UNITED STATES PATENT OFFICE.

ROSS T. REASONS, OF HOPKINSVILLE, KENTUCKY.

TRANSPLANTER.

SPECIFICATION forming part of Letters Patent No. 601,984, dated April 5, 1898.

Application filed September 16, 1897. Serial No. 651,930. (No model.)

*To all whom it may concern:*

Be it known that I, ROSS T. REASONS, a citizen of the United States, residing at Hopkinsville, in the county of Christian and State of Kentucky, have invented certain new and useful Improvements in Transplanters; and I do hereby declare the following to be a full, clear, and exact description of the invention, such as will enable others skilled in the art to which it appertains to make and use the same.

My invention relates to means for transplanting, whereby plants may be placed in the ground from the hot-home or forcing-bed in a safe and easy manner.
To attain this end, my invention comprises a sectional pot in which the plant is forced and which is of such construction that the said plant may be easily and readily released therefrom and also that the said pots may be compactly assembled in the forcing-house.

I will first fully describe my invention with relation to the accompanying drawings, in which—

Figure 1 shows a side elevation of the pot.
Fig. 2 is a front elevation thereof. Fig. 3 is a plan view. Fig. 4 shows the section of a forcing or green house with a pot in place. Fig. 5 shows a loosening-scoop.

In all of the views the same numeral indicates the same part.

1 is a bottom plate, preferably of cast-iron, in one end of which is secured a rod standard 2, secured thereto by the threaded nuts 3 and ending in a loop-handle 4. Pivotally secured on the said rod standard 2 are the semicircular bands 5, brazed or otherwise secured, within which are the hemicylinders 6, of sheet metal or similar material, adapted when the ends of the bands 5 are brought together to
form a pot. The ends of the said bands are provided with slotted openings for the pins 7, with a key-lug 8 passing through a slotted opening at 9 of the plate 1.

The plant being placed within the pot described, it is hung by its handle portion 4 to the hooks or pins 10 of the strips 11, supported by the standards 12 of the glazed forcing-house 13. To transplant the plant into the garden, the scoop 14 is used to loosen the earth near the sides 6. Then the pin 7 is withdrawn, the sides 6 swing apart, and the bottom 1 slides from beneath the plant.

Passing through or otherwise secured to the standards 12 are a series of rods 15, placed one above the other and adapted to support the board or plank 16, upon which the gardener may walk or be supported while tending the plants within the greenhouse.

It is obvious that the constructions I have shown are not only of utility for transplanting purposes, but the pots being supported as described become accessible to light and moisture and easy of approach by the gardener.

Having fully described my invention, what I claim is—

A non-separable transplanting-pot, comprising the bottom plate, a handled rod secured thereto, semicylindrical sides pivoted to the rod, and a key-lugged retaining-pin therefor, substantially as described.

In testimony whereof I affix my signature in presence of two witnesses.

ROSS T. REASONS.

Witnesses:
ROYAL E. BURNHAM,
HUGH M. STERLING.